United States Patent
Wheeler et al.

(10) Patent No.: US 6,587,522 B1
(45) Date of Patent: Jul. 1, 2003

(54) CHANNEL ESTIMATION DEVICE FOR DIGITAL TELECOMMUNICATIONS STATIONS

(75) Inventors: David Andrew Wheeler, Berkshire (GB); Joanna Hart, Berkshire (GB); Stephen Truelove, Berkshire (GB)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/340,933

(22) Filed: Jun. 28, 1999

(30) Foreign Application Priority Data

Jun. 30, 1998 (GB) .............................................. 9813985

(51) Int. Cl.[7] .......................... H04B 7/26; H04L 27/14; H04L 27/22
(52) U.S. Cl. ....................................... 375/343; 375/346
(58) Field of Search ................................ 375/231, 148, 375/150, 152, 340, 343, 344, 346

(56) References Cited

U.S. PATENT DOCUMENTS

| | | | | |
|---|---|---|---|---|
| 5,373,507 A | * | 12/1994 | Skold | 370/350 |
| 5,606,580 A | * | 2/1997 | Mourot et al. | 375/340 |
| 5,710,796 A | * | 1/1998 | Jarvela et al. | 375/344 |
| 5,937,014 A | * | 8/1999 | Pelin et al. | 375/340 |
| 5,978,416 A | * | 11/1999 | Watanabe et al. | 375/231 |
| 6,026,130 A | * | 2/2000 | Rahmatullah et al. | 375/340 |
| 6,304,599 B1 | * | 10/2001 | Igarashi | 375/232 |
| 6,327,315 B1 | * | 12/2001 | Piirainen | 375/340 |
| 6,347,126 B1 | * | 2/2002 | Nagayasu et al. | 375/344 |

FOREIGN PATENT DOCUMENTS

| | | | |
|---|---|---|---|
| EP | 0 551 803 A1 | * | 7/1993 |
| EP | 0 701 334 A2 | | 3/1996 |
| EP | 0 715 440 A1 | | 6/1996 |
| GB | 2 309 864 A | | 8/1997 |
| WO | wo 98/01959 | * | 1/1998 |

* cited by examiner

*Primary Examiner*—Young T. Tse
(74) *Attorney, Agent, or Firm*—Scully, Scott, Murphy & Presser

(57) ABSTRACT

The object of the present invention is to provide the channel estimation device which can provide a morn accurate channel estimation in the interference and/or thermal noise then has been possible heretofore. A channel estimation device in accordance with the invention comprises a first estimator operating to provide a time error estimate in accordance with the correlation between a central group of bits of a received training sequence with the corresponding bits of an expected training sequence, an average for averaging the signal corresponding to each bit of a first sub-group of the bits of the training sequence with the signal corresponding to equivalent bit in a second sub-group of the bits of the training sequence, the first and second sub-groups of bits being expected to be identical, and a second estimator operating to recalculate the timing error estimate in accordance with the correlation between the same central group of bits in the received training sequence corrected by substituting the averaged signals for those contained in the received training sequence and the corresponding bits of the expected training sequence.

3 Claims, 1 Drawing Sheet

CHANNEL ESTIMATION DEVICE FOR DIGITAL TELECOMMUNICATIONS STATIONS

BACKGROUND OF THE INVENTION

This invention relates to a channel estimation device for digital telecommunications station, such as a GSM mobile telephone.

In the GSM system each data burst transmitted by a base station includes a "mid-amble" including a 26 bit training sequence. These training sequences, are used by the mobile station to calculate channel taps required for demodulation of data within each timeslot transmitted from the CSM base station. The ability of the demodulator to reconstruct error free data is limited by the quality of the channel estimation.

The mobile station in fact uses each training sequence to locate the centre of the signal burst containing it. It does this by comparing the part of the burst where the training sequence is expected to be with a locally generated sequence which matches the expected training sequence. In conventional channel estimation devices, the central sixteen bits of the training sequence are correlated with the expected sequence and the result is used to estimate the timing error so that the channel taps can be set accordingly.

The conventional arrangement operates satisfactorily in the absence of interference, thermal noise and varying Doppler shifts. When these conditions are present, however, the estimation may be sufficiently inaccurate to prevent proper reconstruction and decoding of the data signals.

BRIEF SUMMARY OF THE INVENTION

It is thus an object of the invention to provide a channel estimation device which can provide a more accurate channel estimation in the presence of interference and/or thermal noise than has been possible heretofore.

A channel estimation device in accordance with the invention comprises a first estimator means operating to provide a time error estimate in accordance with the correlation between a central group of bits of a received training sequence with the corresponding bits of an expected training sequence, averaging means for averaging the signal corresponding to each bit of a first sub-group of the bits of the training sequence with the signal corresponding to equivalent bit in a second sub-group of the bits of the training sequence, the first and second sub-groups of bits being expected to be identical, and second estimator means operating to recalculate the timing error estimate in accordance with the correlation between the same central group of bits in the received training sequence corrected by substituting the averaged signals for those contained in the received training sequence and the corresponding bits of the expected training sequence.

In the GSM system, there are eight different training sequences, and the first ten bits of 'each are identical to the last ten. The first and second subgroups of bits could thus be the first ten bits and the last ten bits respectively.

With this arrangement there is found to be an improvement of the raw bit error rate of the order of 0.5 to 1 dB. The amount of extra processing required is small and is thus well suited to incorporation in the DSP (digital signal processor) used for much of the processing in GSM mobile telephones.

BRIEF DESCRIPTION OF THE DRAWINGS

An example of the invention is illustrated by the accompanying drawings in which.

DETAILED DESCRIPTION OF THE INVENTION

Figure 1:
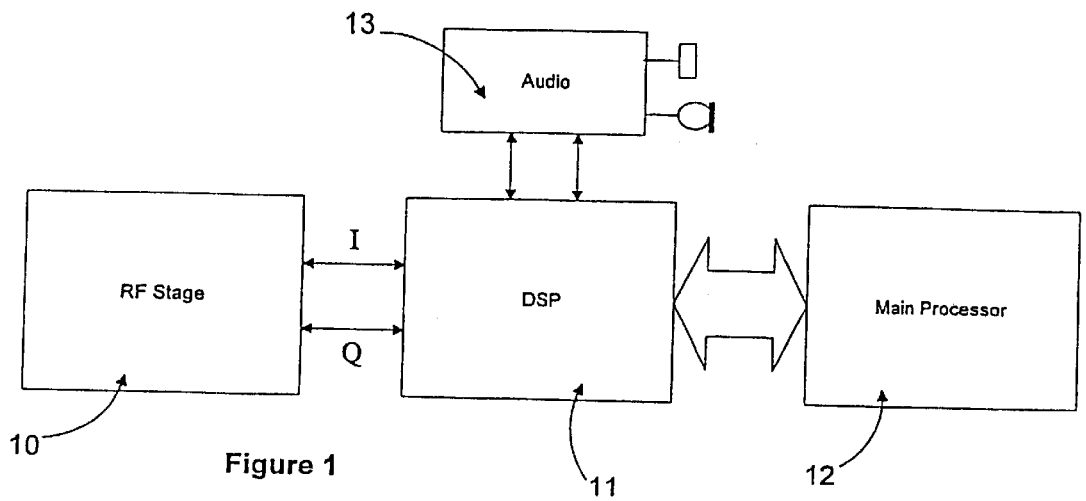
FIG. 1 is a block diagram of a mobile telephone.

Referring firstly to FIG. 1, the mobile telephone includes RF stages 10 and a digital signal processor (DSP) 11 which includes a demodulator which receives batches of I, Q samples from the RF stages 10. The DSP 11 includes a bank of RAM for storing the batches of samples for processing to enable the data represented by the samples to be reconstructed accurately decoded and passed to the audio section 13 of the telephone, or to the main processor 12. Among the many functions of the DSP are the detection of frequency differences between the received signals and the local clock circuit, the correction of the frequency error by rotation or de-rotation of the incoming signals and the synchronization of telephone time frame with the received signals. This latter function involves analyzing each received signal burst to provide an appropriate time frame correction to enable the data in each burst to be extracted cleanly.

For this latter purpose the majority of bursts transmitted by each base station in the GSM system include a "mid-amble", with data bits preceding and following the mid-amble. The mid-amble contains a 26 bit training sequence. The GSM system specifies eight training sequences (TSCs) as follows:

| TSC | $a_0$ | Training sequence bits ($a_0$ to $a_{25}$) | $a_{15}$ | | $a_{25}$ |
|---|---|---|---|---|---|
| 0 | 0, 0, 1, 0, 0 | 1, 0, 1, 1, 1 | 0, 0, 0, 0, 1, 0 | 0, 0, 1, 0, 0 | 1, 0, 1, 1, 1 |
| 1 | 0, 0, 1, 0, 1 | 1, 0, 1, 1, 1 | 0, 1, 1, 1, 1, 0 | 0, 0, 1, 0, 1 | 1, 0, 1, 1, 1 |
| 2 | 0, 1, 0, 0, 0 | 0, 1, 1, 1, 0 | 1, 1, 1, 0, 1, 0 | 0, 1, 0, 0, 0 | 0, 1, 1, 1, 0 |
| 3 | 0, 1, 0, 0, 0 | 1, 1, 1, 1, 0 | 1, 1, 0, 1, 0, 0 | 0, 1, 0, 0, 0 | 1, 1, 1, 1, 0 |
| 4 | 0, 0, 0, 1, 1 | 0, 1, 0, 1, 1 | 1, 0, 0, 1, 0, 0 | 0, 0, 0, 1, 1 | 0, 1, 0, 1, 1 |
| 5 | 0, 1, 0, 0, 1 | 1, 1, 0, 1, 0 | 1, 1, 0, 0, 0, 0 | 0, 1, 0, 0, 1 | 1, 1, 0, 1, 0 |
| 6 | 1, 0, 1, 0, 0 | 1, 1, 1, 1, 1 | 0, 1, 1, 0, 0, 0 | 1, 0, 1, 0, 0 | 1, 1, 1, 1, 1 |
| 7 | 1, 1, 1, 0, 1 | 1, 1, 1, 0, 0 | 0, 1, 0, 0, 1, 0 | 1, 1, 1, 0, 1 | 1, 1, 1, 0, 0 |
| | A | B | | A | B |

Although the actual TSCs are as given in the table above, the TSC which the receiver actually uses comprises a bipolar representation of the data (i.e. instead of 1s and 0s, the data is represented as a stream of ±1s)

For time frame correction, the DSP selects the I, Q sample pairs which are expected to form the training sequence and performs a correlation function to test the correlation between these samples and the expected training sequence which is known since it is specified by the base station as part of the call setup procedure. The same TSC is used for every data burst for the duration of any particular call. Only the central 16 bits of the training sequence are used for this purpose. The sequences used are such that, in the absence of interference, thermal noise or Doppler shift effects and provided that the samples tested all fall within the 26 bit training sequence, the correlation function results in a set of coefficients defining the transformation applied to the training sequence as a result of the transmission/reception process.

The inventors have noted the cyclic nature of the training sequences. In each case the first ten bits are the same as the last ten bits. The same cyclic pattern should also be expected in the absence of interference and the other effects referred to above, but may partially disappear when such effects occur.

Figure 2:
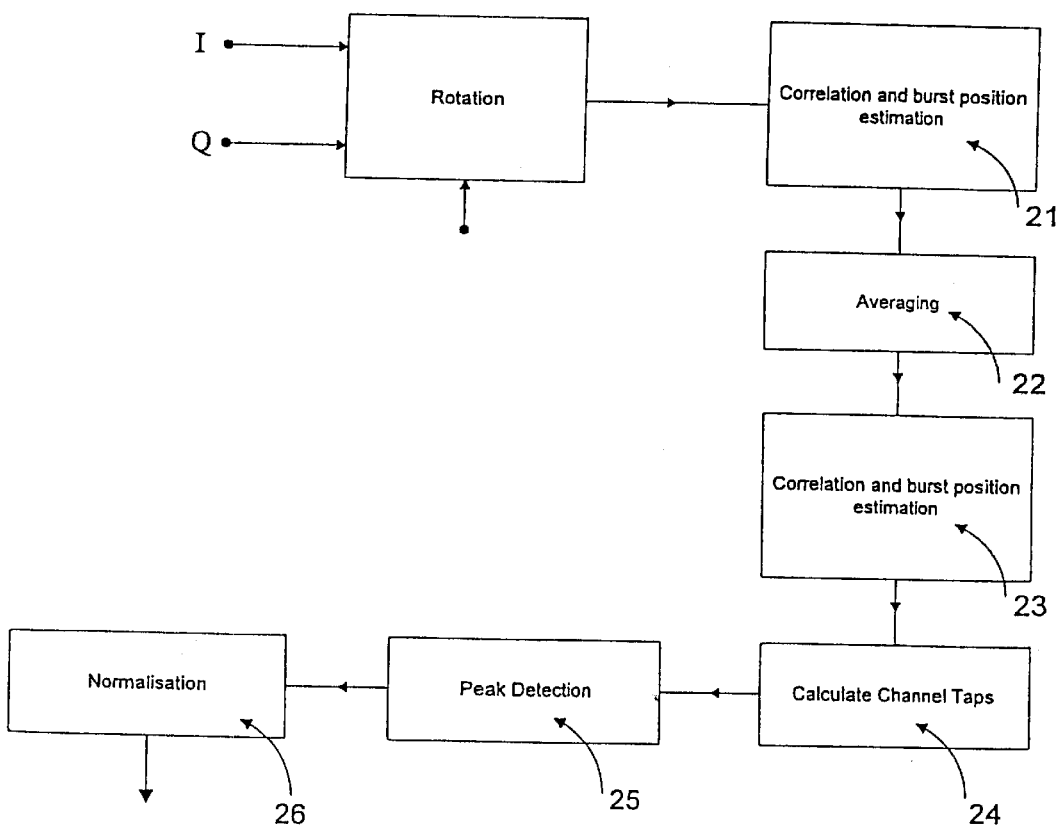
FIG. 2 is a block diagram of an example of a channel estimation device in accordance with the invention.

As shown in FIG. 2, the channel estimation device in accordance with the present invention includes two extra stages, namely a preliminary correlation and burst position estimation stage 21 and an averaging stage 22.

In the preliminary stage 21, the conventional correlation and error estimation processes are carried out to enable a coarse timing correction to be performed and the samples which represent the training sequence provisionally identified.

The averaging stage 22 calculates the average of each 1, Q sample pair in a first subgroup representing TSC bits 0 to 9, with the corresponding 1, Q sample pair in a second subgroup representing TSC bits 16 to 25 and storing the ten average results, overwriting the original samples at symbol locations 0 to 9 and 16 to 25.

The normal correlation and error estimation stage is now repeated (23) but with the averaged I, Q sample pairs substituted for those originally in the first and second subgroups.

The normal stages of channel tap selection 24, peak detection 25 and normalization 26 are then carried out.

The addition of the extra stages 21 and 22 in the estimation device provides improved accuracy in channel tap selection, sufficient, in simulated use, to provide a 0.5 to 1 dB improvement in raw bit error rate.

In the example described above, the first and last ten bits of the 26 bit training sequence were used as the first and second subgroups for all training sequences. A further small improvement in accuracy can be obtained in some circumstances by averaging only the second to eighth bits with the eighteen to twenty fifth bits, i.e. ignoring the first and last bits of each of the subgroups identified above.

This small improvement can be obtained because of potential inter-symbol interference which can occur when the stealing flags immediately preceding and following the training sequence in the mid-amble do not match the fifteenth and tenth bits of TSC respectively.

However, the values of the stealing flags cannot be ascertained with certainty before the channel taps have been finally selected. On the assumption that the stealing flags will most commonly be zero (for speech bursts), therefore, the estimation device described above can be improved further slightly by averaging the full 10 bits of each subgroup when the tenth bit of the TSC is zero and averaging only the inner eight bits of each subgroup when the tenth bit of the TSC is one.

We claim:

1. A channel estimation device for a digital telecommunication station comprising a first estimator operating to provide a time error estimate in accordance with the correlation between a central group of bits of a received training sequence with the corresponding bits of an expected training sequence, an averager for averaging the signal corresponding to each bit of a first sub-group of the bits of the received training sequence with the signal corresponding to an equivalent bit in a second sub-group of the bits of the received training sequence, the first and second sub-groups of bits being expected to be identical, and a second estimator operating to re-calculate the time error estimate in accordance with the correlation between the same central group of bits in the received training sequence corrected by substituting the averaged signals for said bits contained in the received training sequence and the corresponding bits of the expected training sequence.

2. A channel estimation device as claimed in claim 1, in which the first sub-group comprises the first n bits of the received training sequence and the second sub-group comprises the last n bits of the received training sequence.

3. A channel estimation device as claimed in claim 2, in which the first and second sub-groups are reduced to the n-2 central bits of each sub-group when a specific bit of the expected training sequence has a specific value.

* * * * *